(12) United States Patent
Urke et al.

(10) Patent No.: US 12,439,897 B2
(45) Date of Patent: Oct. 14, 2025

(54) WATER AND SEAFOOD FLOW DISTRIBUTOR

(71) Applicant: MMC FIRST PROCESS AS, Fosnavåg (NO)

(72) Inventors: Jan Petter Urke, Haramsøy (NO); Leif Roger Gjelseth, Bølandet (NO); Karl-Johan Mork, Ulsteinvik (NO)

(73) Assignee: MMC FIRST PROCESS AS, Fosnavåg (NO)

( * ) Notice: Subject to any disclaimer, the term of this patent is extended or adjusted under 35 U.S.C. 154(b) by 41 days.

(21) Appl. No.: 18/271,398

(22) PCT Filed: Jan. 6, 2022

(86) PCT No.: PCT/EP2022/050201
§ 371 (c)(1),
(2) Date: Jul. 7, 2023

(87) PCT Pub. No.: WO2022/148808
PCT Pub. Date: Jul. 14, 2022

(65) Prior Publication Data
US 2024/0057568 A1    Feb. 22, 2024

(30) Foreign Application Priority Data
Jan. 8, 2021 (NO) .................................... 20210024

(51) Int. Cl.
*A01K 63/04*    (2006.01)
*A01K 61/90*    (2017.01)
(Continued)

(52) U.S. Cl.
CPC ............ *A01K 63/047* (2013.01); *A01K 61/90* (2017.01); *A01K 63/02* (2013.01); *A01K 79/00* (2013.01);
(Continued)

(58) Field of Classification Search
CPC .............................. A01K 63/047; A01K 79/00
See application file for complete search history.

(56) References Cited

U.S. PATENT DOCUMENTS 4,223,700 A * 9/1980 Jones ...................... E21B 23/12
406/182
5,181,479 A * 1/1993 Hiebert .................. A01K 79/00
43/103
(Continued)

FOREIGN PATENT DOCUMENTS

CN        210382319 U     4/2020
JP         53-56102 U     5/1978

*Primary Examiner* — Eric Keasel
(74) *Attorney, Agent, or Firm* — Rimon Law, P.C.

(57) ABSTRACT

A water and seafood flow distributor (1) for routing flowable mass from a first location to a selected one of a second plurality of locations. The distributor (1) has a first pipe (5) and a second bent pipe (51), which are in communication with one another at a first end (8, 8') via a mass mover. The second bent pipe (5') is rotatable about the first end (81) to displace a second end (91) along a circle (121). A first conduit (10) is in communication with the first location, and a plurality of second conduits (10') are in communication with a respective one of the second plurality of locations, and the ends of the conduits are arranged along a circle (12') described by the second end (91) of the second bent pipe (51). The first and second conduits can be fluidly connected through the first and second pipes.

7 Claims, 5 Drawing Sheets

(51) Int. Cl.
*A01K 63/02* (2006.01)
*A01K 79/00* (2006.01)
*B65G 51/01* (2006.01)
*B65G 51/24* (2006.01)
*B65G 53/30* (2006.01)
*B65G 53/56* (2006.01)
*F16K 11/00* (2006.01)

(52) U.S. Cl.
CPC ............ *B65G 51/01* (2013.01); *B65G 51/24* (2013.01); *B65G 53/30* (2013.01); *B65G 53/56* (2013.01); *F16K 11/00* (2013.01); *B65G 2201/047* (2013.01); *B65G 2811/0647* (2013.01)

(56) References Cited

U.S. PATENT DOCUMENTS 5,329,968 A * 7/1994 Powell .................... F16K 11/08
251/192
10,598,185 B2 * 3/2020 Henny .................. F04D 13/043

* cited by examiner

WATER AND SEAFOOD FLOW DISTRIBUTOR

RELATED APPLICATION

The present application is a national stage application of International Patent Application Serial No. PCT/EP2022/050201, filed on Jan. 6, 2022, which claims priority from NO20210024, filed on Jan. 8, 2021, the disclosure and content of which is incorporated by reference in its entirety for all purposes.

TECHNICAL FIELD

The present application relates to a water and seafood flow distributor. The flow distributor is in particular adapted for transport and distribution of flowable matter between different locations, in particular water and live fish between tanks or pens.

BACKGROUND ART

When water and biomass is distributed, the flow can be directed through different pipes depending on which source the flow is to be taken from and the intended destination. Traditionally, a pipe has been laid from the source to the destination. However, this requires a new pipe to be laid or an existing pipe to be rearranged if the source or destination, or both, changes.

Consequently, valves have been developed that enables various branches to be connected and which can be chosen depending on the setting of the valve. One such example is shown in NO344973.

A major challenge when designing valves for transport of water and live fish, is that sharp bends and features that the fish can be caught or damaged by should be avoided. Moreover, the valves have a limited selection of pipes that can be chosen from. Usually, there is a possibility of only one inlet and up to three or four outlet, or three or four inlets and only one outlet. If more inlets or outlets are desired, several valves must be arranged in series.

From the area of pneumatic dispatch there are known solutions that allows for a wider range of inlets and outlets. Such systems are, however, not suitable for transporting water.

Some examples of pneumatic dispatch systems are found in US20140356080A1, DE19712251C1, U.S. Pat. No. 3,868,071A, EP2233414A1, U.S. Pat. No. 6,074,136A, CN110217596A and US2012051848.

U.S. Pat. No. 4,252,479A does not describes a pneumatic dispatch system, but a pneumatic arrangement for transport of granular material.

SUMMARY OF INVENTION

The present invention has as its main objective to provide a water and seafood flow distributor that avoids sharp bends and obstacles where the transported goods can get caught or damaged, and that can select between a large number of inlets and outlets. This is achieved by the features recited in claim 1.

The dependent claims define preferable embodiments of the invention.

The flow distributor is in particular suitable for operating together with a pump, such as shown in NO330892, which is incorporated herein by reference.

BRIEF DESCRIPTION OF DRAWINGS

The invention will now be described in further detail, referring to the accompanying drawings, in which.

DETAILED DESCRIPTION OF THE INVENTION

Figure 1:
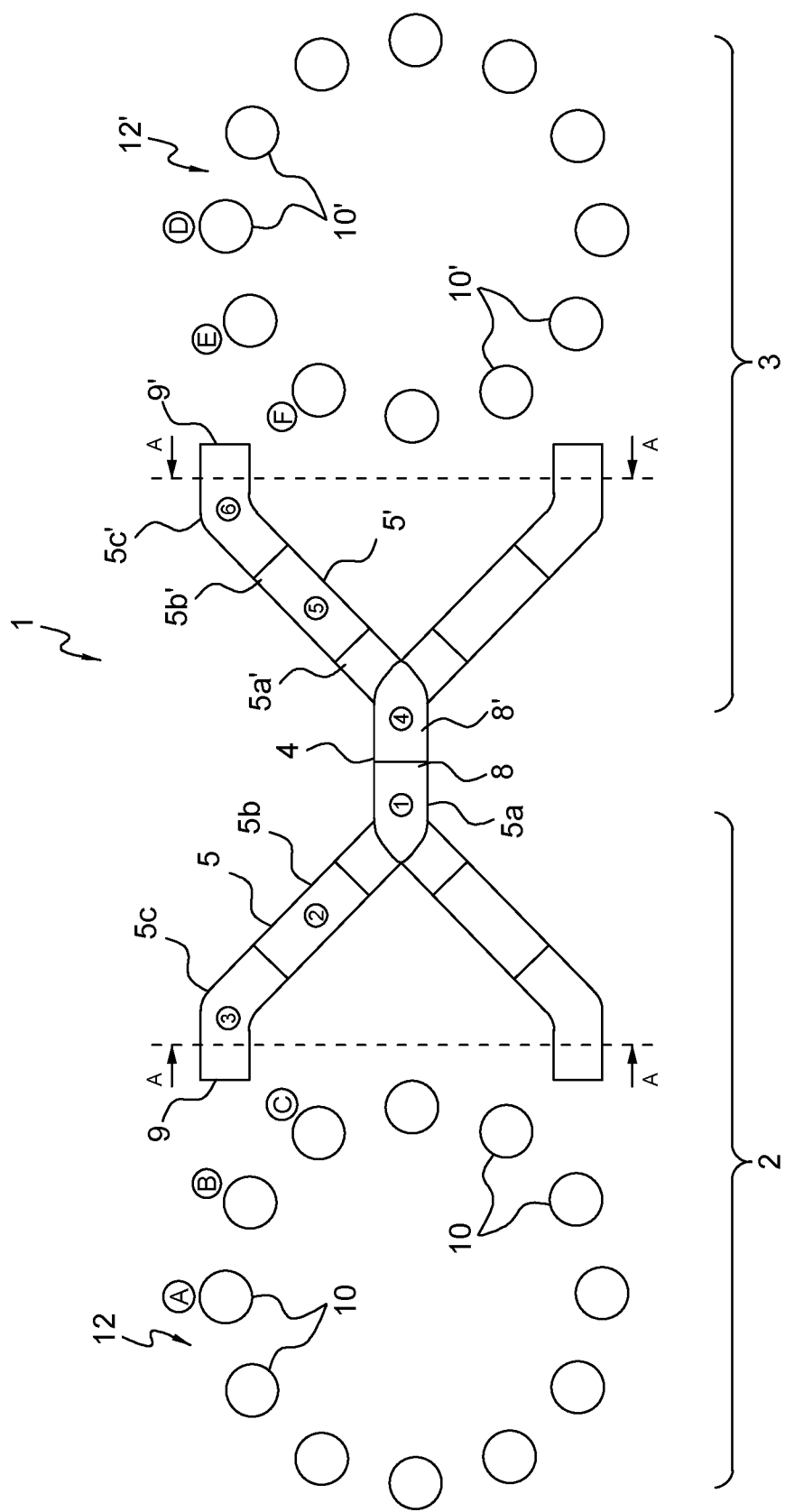
FIG. 1 shows a principal sketch of the flow distributor of the invention.

FIG. 1 shows a principal sketch of the flow distributor 1 of the invention. The flow distributor has an inlet side 2 and an outlet side 3. The two sides are this example shown as in principle identical but mirror images. The inlet and outlet sides 2, 3 can be directly connected at 4, but may also be connected through a pump or other mass mover, which will be explained below. The inlet side 2 and outlet side 3 may also be different. For example, the inlet side 2 may comprise only one pipe that is connected to the outlet side 3 at 4, or through a pump or mass mover.

The inlet side 2 comprises a bent pipe 5, which is made up of a first bend 5a, a straight pipe piece 5b and a second bend 5c. The bends 5a, 5c a and pipe piece 5b may be an integral pipe. The bends have in the illustrated example an angle of about 135 degrees. However, the bend angles may differ from this, but should not be too sharp. A bend angle close to 90 degrees should be avoided.

The two ends 8, 9 of the bent pipe 5 are arranged at different axes. A rotation of the bent pipe about the axis of the inner end 8 displaces the outer end 9 along a circle 12. The outer end 9 can thereby be positioned in alignment with one of several inlet pipes 10 that are arranged in a circle that coincides with the circle 12 of movement of the outer end 9 during the rotation of the bent pipe 5. By rotating the bent pipe 5 to alignment with a selected one of the inlet pipes 10, the bent pipe 5 can be connected to the selected inlet pipe 10 so that a flow can be conducted from the selected inlet pipe 10 through the bent pipe 5 and onwards to the outlet side 3.

The outlet side 3 is designed in a similar way as the inlet side. The outlet side 3 has a bent pipe 5', comprising a first bend 5a', a straight pipe 5b' and a second bend 5c', with an inner end 8' and an outer end 9'. By rotating the bent pipe 5 about the axis of the inner end 8', the outer end 9' will describe a circle 12' and can be connected to a selected one of a plurality of outlet pipes 10', whose ends are arranged along the circle 12'.

In the shown embodiment there are 12 inlet pipes 10 and 12 outlet pipes 10'. Consequently, a total of 12×12=144 different flow routes are possible. If it is possible to flow in both directions a total of 2×144=288 flow routes are possible.

FIGS. 2-5 show different views of a flow distributor according to the invention in combination with a mass mover, such as a pump 11.

Figure 2:
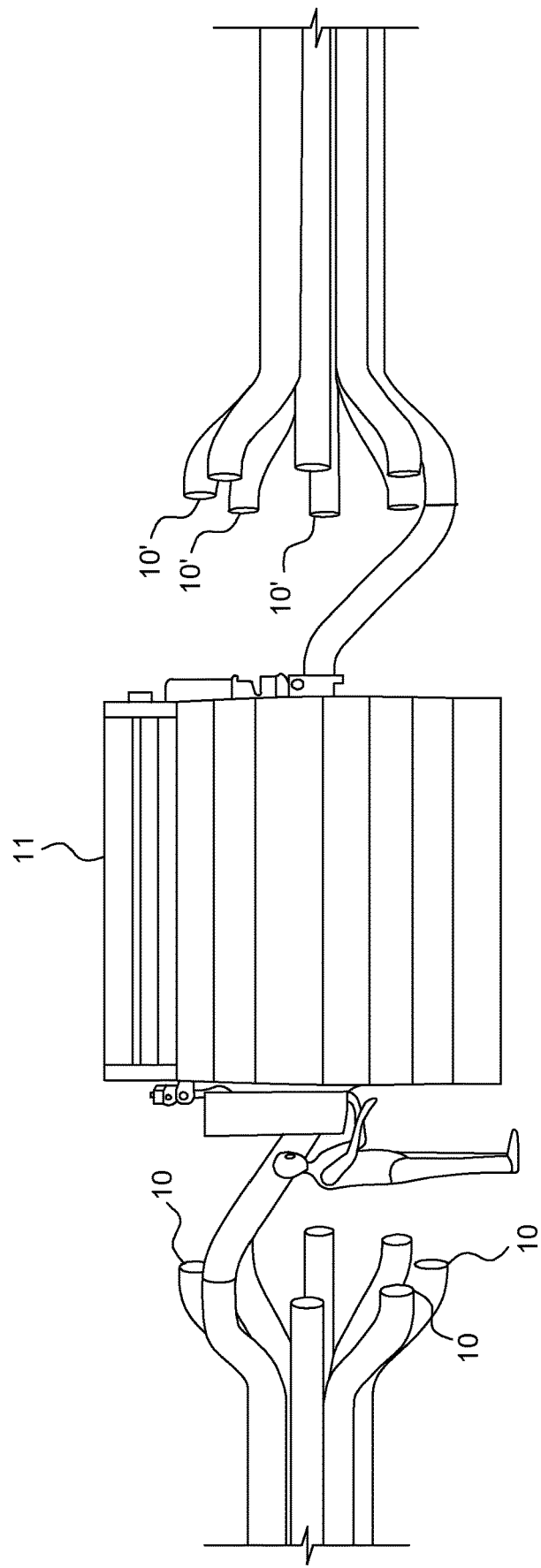
FIG. 2 shows a side elevation view of the flow distributor of the invention.

FIG. 2 shows a side elevation view of the flow distributor and mass mover. In this case the mass mover is a pump 11 working according to the principles of an Archimedes screw, but with a hose (not shown) arranged in a helical shape from the inlet end to the outlet end. Rotation of the hose displaces the mass inside the hose from the inlet to the outlet end. If the mass is a liquid, a suction will be created at the inlet end, which will draw more liquid into the pump. This type of pump may also be denoted as a coil pump, and the principle is illustrated in the above mentioned NO330892. A pump according to this principle is marketed by the present applicant as RID Fish Pump.

A pump of this type gently moves mass from the inlet to the outlet. It is therefore ideal for moving fragile objects, such as live fish.

FIG. 2 shows a plurality of inlet pipes 10 and a plurality of outlet pipes 10'. In this configuration a total of 8×8=64 flow routes are possible, with a doubling of this to 128 when the pump 11 is capable of pumping in both directions.

Figure 3:
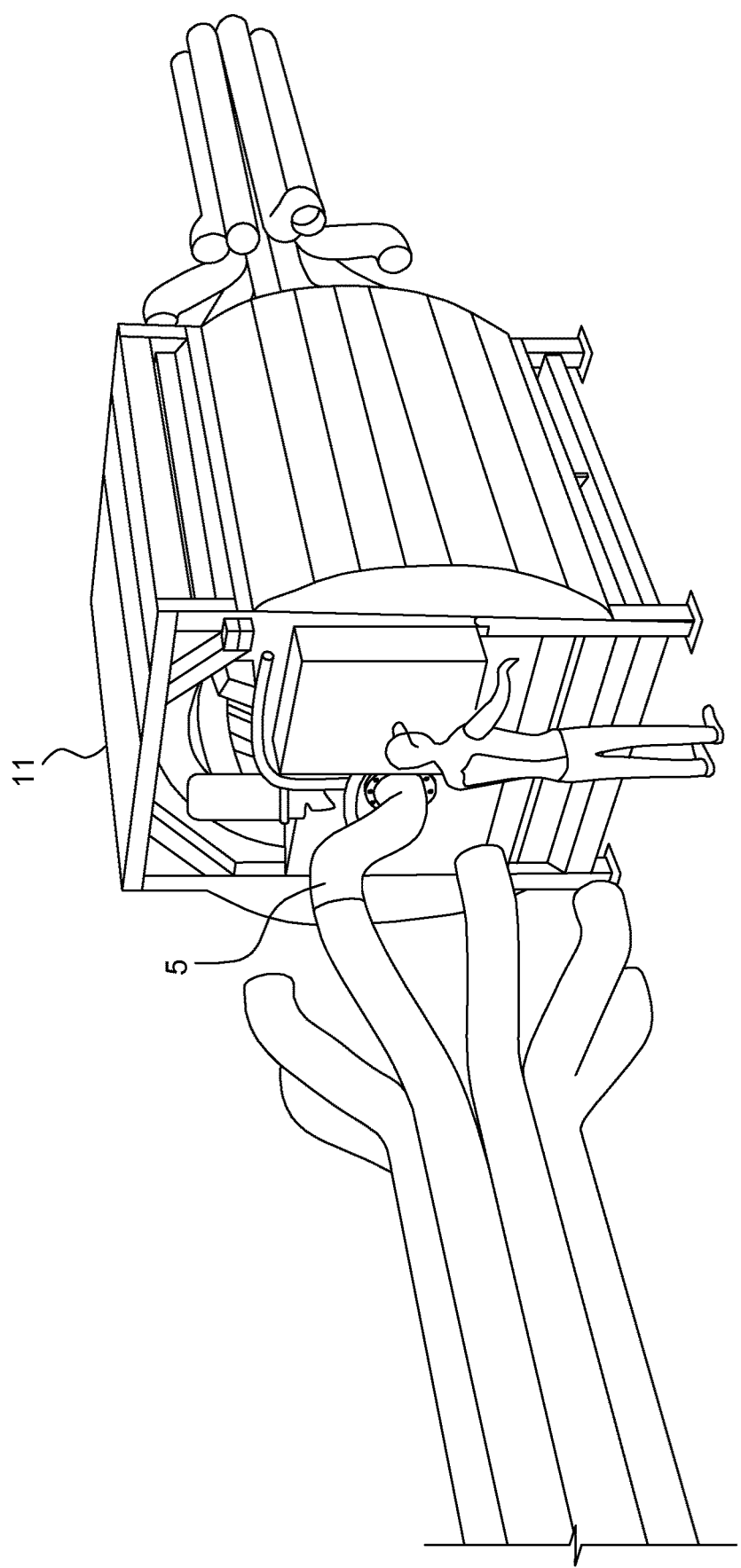
FIG. 3 shows an isometric view of the flow distributor from an inlet side.
Figure 4:
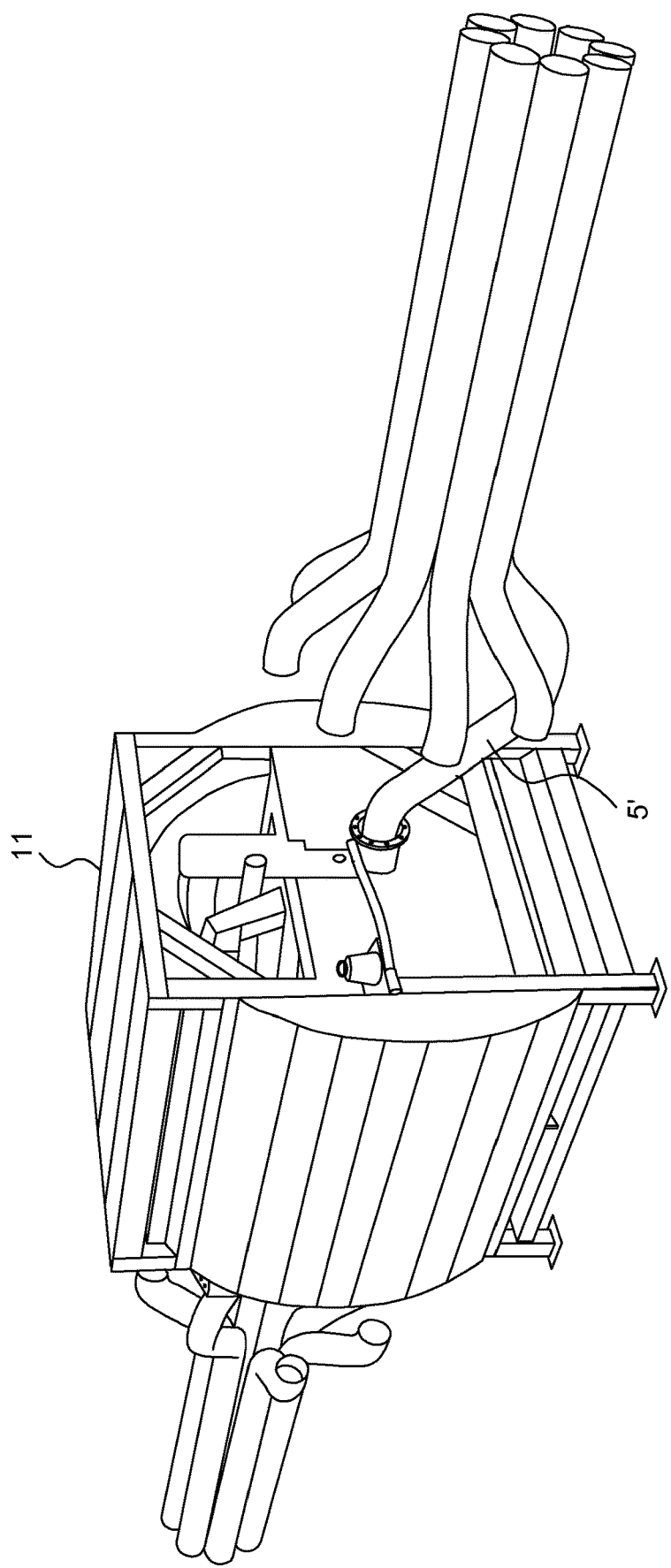
FIG. 4 shows an isometric view of the flow distributor from an outlet side.

FIG. 3 shows the flow distributor arrangement in isometric view from one end, and FIG. 4 shows the arrangement in isometric view from the opposite end.

The pipes 5 and 5' may be rotated manually about their coupling to the pump 11 or by a motor (not shown). The connection to the selected pipe 10 or 10' may be done by having a slidable outer section at the outer end 9, 9' and sealings between the pipes or a flexible section, such as a short hose, at the outer end 10, 10'. The outer end 9, 9' and the end of the pipes 10, 10' may also have flanges or quick connect couplings.

Figure 5:
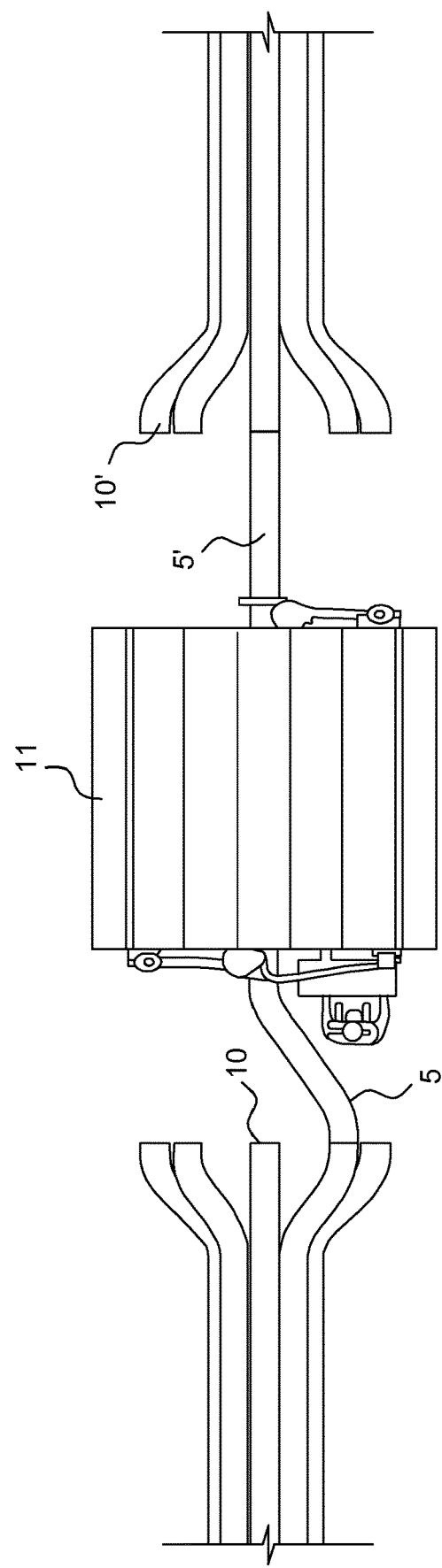
FIG. 5 shows a planar view of the flow distributor.

FIG. 5 shows the flow distributor in planar view with the bent pipes 5 5' connected to selected pipes 10, 10'.

Whereas the described embodiment has inlet pipes 10 and outlet pipes 10' that are arranged close together until some distance from the rotatable pipes 5 and 5' and then are bent outward through two relatively sharp bends, the pipes 10, 10' may extend from different direction towards the rotatable pipes 5, 5'. They may also go through different shaped bends or not be bent at all. The only requirement is that the pipes 10, 10' have their ends along the respective circle 12, 12' that the outer end of the rotatable pipes 5, 5' describes when rotated.

The circles 12, 12' that the rotatable pipes 5, 5' describes, may be of different diameter. The diameters depend on how many inlet pipes 10 or outlet pipes 10' that are fitted.

The flow distributor may be designed with a uniform cross-section along the whole length from the inlet conduits to the outlet conduits. Sharp bends, such as with angles smaller than 135 degrees, may be avoided.

The invention claimed is:

1. A water and seafood flow distributor (1) for routing said water and seafood from a first location to a selected one of a plurality of second locations, said flow distributor (1) comprising a first pipe (5) and a second bent pipe (5'), and a mass mover, said first and second pipes (5, 5') being in communication with one another at a first respective end (8, 8') via said mass mover, said second bent pipe (5') being rotatable about an axis of said first end (8'), said rotation displacing a second end (9') of said second bent pipe (5') along a circle (12'); at least one first conduit (10) being in communication with said first location, and a plurality of second conduits (10') being in communication with a respective one of said second plurality of locations, said second conduits (10') having respective ends that are arranged along said circle (12') described by said second end (9') of said second bent pipe (5'), said second bent pipe (5') being connectable to a respective selected one of said second conduits (10') when said second end (9') of said second bent pipe (5') is aligned with a selected second conduit end, wherein said mass mover is a coil pump, having at least one coil pump conduit extending in a helical shape from an inlet to an outlet end.

2. The water and seafood flow distributor of claim 1, wherein said first pipe (5) is a bent pipe that is rotatable about an axis of said first end (8) so that a second end (9) of said first pipe (5) described a circle (12); said second end (8) of said first pipe (5) being connectable to a respective on of a plurality of first conduits (10), having respective ends arranged along said circle (12), when said second end (9) of said first bent pipe (5) is aligned with a selected first conduit end.

3. The water and seafood flow distributor of claim 1, wherein either of said first and second bent pipes is coupled to a motor for rotation of the pipe coupled to the motor.

4. The water and seafood flow distributor of claim 1, wherein either of said first and second bent pipes has a slidable outer section at said second end, that can be pushed into coupling with a selected one of the plurality of second conduits.

5. The water and seafood flow distributor of claim 1, wherein either of said first and second bent pipes has a flexible outer section at said outer end.

6. The water and seafood flow distributor of claim 1, wherein the distributor has a flow path defined by the first pipe, the second bent pipe the at least one first conduit, the selected on of the plurality of second conduits, and the helical conduit of the coil pump has a uniform internal cross-section.

7. The water and seafood flow distributor of claim 1, wherein all bend angles of each of the first pipe and the second bent pipe are at least 135 degrees.

* * * * *